Figure 7:
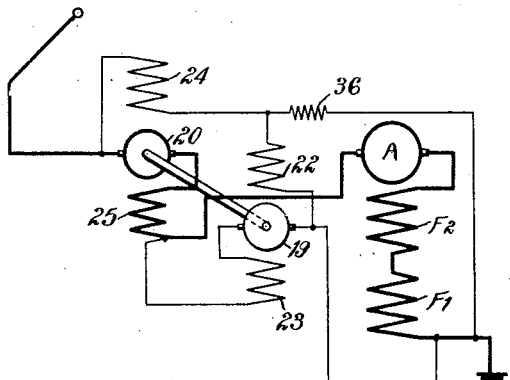

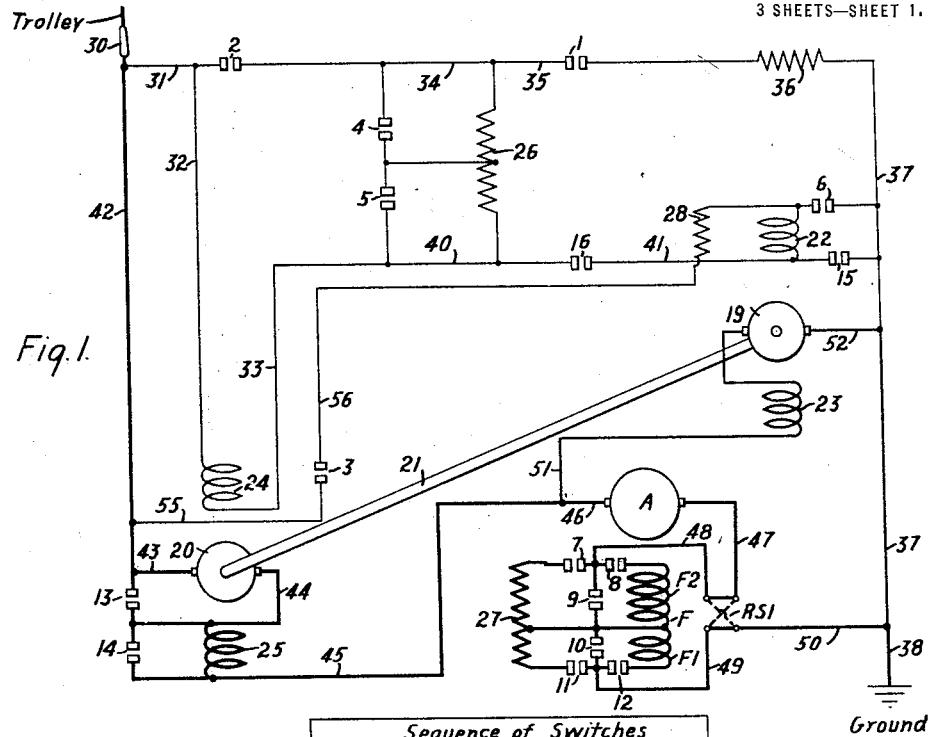

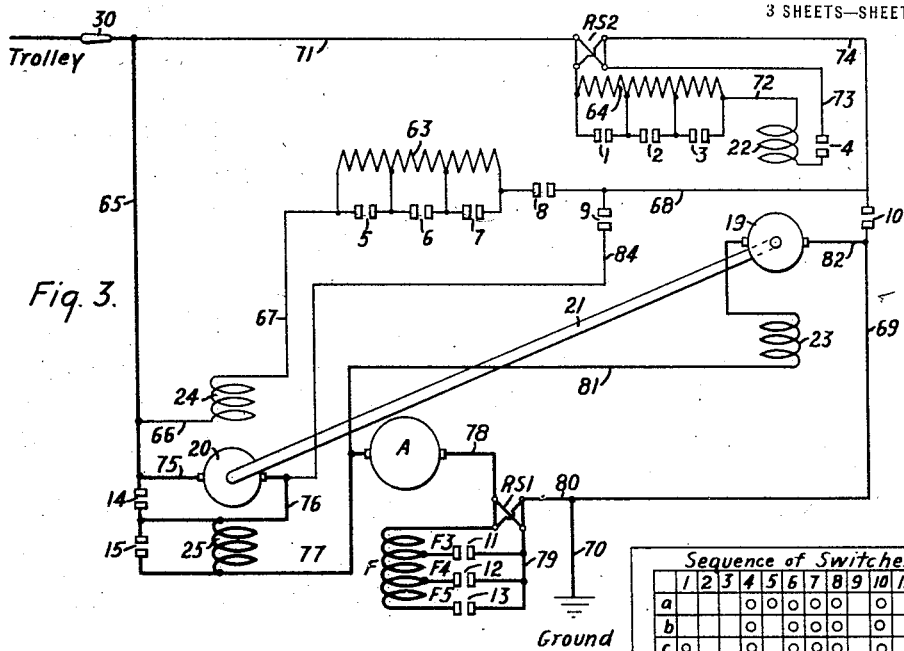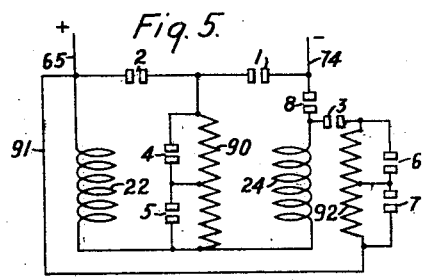

R. E. HELLMUND.
SYSTEM OF CONTROL.
APPLICATION FILED FEB. 13, 1917.

1,335,112.   Patented Mar. 30, 1920.
3 SHEETS—SHEET 3.

WITNESSES:
J. R. Wurmb
W. B. Wells

INVENTOR
Rudolf E. Hellmund
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,335,112.  Specification of Letters Patent.  Patented Mar. 30, 1920.

Application filed February 13, 1917. Serial No. 148,419.

*To all whom it may concern:*

Be it known that I, RUDOLF E. HELLMUND, a subject of the Emperor of Germany, and a resident of Swissvale, in the county of Allegheny and State of Pennsylvania, have invented a new and useful Improvement in Systems of Control, of which the following is a specification.

My invention relates to systems of control and especially to regenerative systems for electric-railway-vehicle motors and the like.

In my co-pending application, Serial No. 39,375, filed July 12, 1915, patented May 13, 1919, No. 1,303,308, is set forth and claimed a regenerative control system wherein a plurality of mechanically connected auxiliary armatures are employed to effect acceleration and regeneration of a main machine or machines without the use of main-circuit resistors, the electromotive forces of the auxiliary armatures being suitably employed and varied to produce the desired results.

The object of my present invention is to provide certain simplified and improved circuit connections for a system of the character in question, whereby a relatively inexpensive and reliable control system obtains.

More specifically stated, it is the object of my invention to provide a regenerative-control system embodying a main dynamo-electric machine provided with an exciting field winding having a plurality of unequal parts, such parts being utilized in the increasing order of their size and being combined in such manner as to effect a gradual increase of machine excitation as the machine speed decreases.

Other specific objects of the invention will become apparent from the following description and are fully set forth in the claims.

My invention may best be understood by reference to the accompanying drawings, wherein Figure 1 is a diagrammatic view of the essential main and auxiliary circuits of a system of control embodying my present invention; Fig. 2 is a sequence chart, of well-known form, indicating the order of closure of the various switches that are shown in Fig. 1 during both the accelerating and the regenerative periods; Fig. 3 is a diagrammatic view of a modification of the system illustrated in Fig. 1; Fig. 4 is a sequence chart, corresponding to Fig. 2, and indicating the preferred order of switch operation in the system of Fig. 3; Fig. 5 is a diagrammatic view of a modification of a portion of the system shown in Fig. 1; and Fig. 6 is a sequence chart indicating the preferred order of closure of the switches illustrated in Fig. 5; and Figs. 7 to 11, inclusive, are diagrammatic views illustrating the circuits completed through the main dynamo-electric machine.

Referring to Fig. 1 of the drawings, the system shown comprises suitable supply-circuit conductors respectively marked "Trolley" and "Ground"; a main dynamo-electric machine having an armature A and a plural-part field winding F of the series type; an auxiliary motor-generator set having mechanically connected armatures 19 and 20; a plurality of suitable switching devices 1 to 16, inclusive, for governing the operation of the various machines; and a plurality of auxiliary-circuit resistors 26, 27 and 28, for purposes to be described.

The auxiliary armatures 19 and 20 may be mechanically coupled in any convenient manner, as by a shaft 21. The generator or driven-armature winding 19 is provided with a shunt-excited field winding 22 and a series-related field winding 23, while the motor or driving armature 20 is similarly provided with a shunt-excited field winding 24 and a series-related field winding 25.

Inasmuch as the particular auxiliary controlling means for closing the various switches in the desired sequence is immaterial to my present invention and may be readily supplied by those skilled in the art, I have not deemed it necessary to show or describe a master controller and auxiliary governing circuits. It will be understood that the various switches 1 to 16, inclusive, are preferably of a well-known electrically-controlled type, the actuating coils of which are energized through a master controller, in accordance with the sequence chart of Fig. 2.

Assuming that it is desired to effect acceleration of the main machine, a switch 30 may be closed, whereby, as soon as the master controller or other auxiliary governing means has been actuated to its first operative position $a$ to close the switches 1, 4, 5, 6, 8, 12 and 16, as indicated by the line $a$ of the sequence chart, one circuit is completed from the Trolley through the switch 30, conductors 31 and 32, the shunt-excited field winding 24 for the auxiliary-motor armature 20, conductor 33, switches 5 and 4, conductors 34 and 35, a switch 1, a relatively small preventive resistor 36 and conductors 37 and 38 to the negative conductor "Ground", thereby strongly exciting the auxiliary motor armature 20.

A further auxiliary circuit is completed from the conductor 33 through conductor 40, switch 16, conductor 41, the shunt-excited field winding 22 for the auxiliary-generator armature 19 and switch 6 to the negative conductor 37. Thus, a relatively weak current traverses the field winding 22, the auxiliary-field winding 24 for the motor armature 20 serving as a resistor for this purpose and thereby tending to simplify the circuit connections and reduce the cost and weight of the system.

The main-machine circuit is established from the Trolley switch 30 through conductors 42 and 43, the auxiliary-motor armature 20, conductor 44, series-related field winding 25 for the auxiliary armature, conductors 45 and 46, the main armature A, conductor 47, certain contact members (not shown) of a familiar type of reversing switch RS1, which is here shown conventionally for purposes of simplicity and clearness, conductor 48, switch 8, the entire main-field winding F, switch 12, conductor 49, certain other contact members (not shown) of the reversing switch RS1 and conductor 50 to the negative conductor 38.

The main machine is thus started into operation with a relatively low voltage impressed across its terminals, since the relatively strong excitation of the auxiliary-motor armature 20, by reason of the full energization of its field windings 24 and 25, produces a counter-electromotive force nearly equal to the supply-circuit voltage. The circuit completed through the main machine is illustrated in Fig. 7 of the drawing.

The energy absorbed by the auxiliary-motor armature 20, with the exception of the necessary electrical and mechanical losses therein, is transmitted to the generating armature 19, which is connected through its series-related field winding 23 and conductors 51 to one terminal of the main armature A and through conductor 52 to the negative supply-circuit conductor "Ground", thereby returning the greater portion of the energy in question to the main motor and thus tending to produce a relatively economical system of control with respect to energy consumption.

As indicated by the sequence chart, in positions $b$ and $c$ of the master controller (not shown), the switches 4 and 5 are respectively opened, thereby inserting increasing amounts of the resistor 26 in circuit with the shunt-excited field winding 24 for the auxiliary motor armature 20 and thus reducing the excitation and counter-electromotive force of the armature in question. Such reduction of counter-electromotive force in the auxiliary armature automatically effects the impression of a correspondingly increasing voltage upon the terminals of the other auxiliary armature 19 and of the main armature A which thus increases in speed.

Position $d$ effects the opening of the switch 1 preparatory to the closure of switch 2, which takes place when the master controller occupies its position $e$, to thereby connect the field winding 24 across the resistor 26 and effect a still further decrease of the excitation of the auxiliary-motor armature 20.

In positions $f$ and $g$, switches 5 and 4 are respectively closed to gradually short-circuit the resistor 26 and thus still further reduce the excitation provided by the auxiliary-field winding 24. Such concurrent closure of the switches 2, 4 and 5 constitute a complete short-circuit of the field winding 24 which is therefore virtually ineffective.

In position $h$, switch 14 is closed to short-circuit the series-related field winding 25 and thus reduce the excitation and, therefore, the counter-electromotive force of the auxiliary-motor armature 20 to a negligible value, whereby the main armature A receives a voltage very nearly equal to the supply-circuit voltage, the full value of which is impressed upon the main armature in position $i$ of the master controller, which effects the closure of switch 13 to short-circuit the auxiliary armature 20.

Further speed control of the main armature is effected by moving the master controller successively to positions $j$, $k$ and $l$, whereby switch 11 is first closed to connect a section of the resistor 27 across the minor portion $F^1$ of the main-field winding F, switch 10 is next closed to short-circuit the resistor section and the field winding portion just mentioned, and switch 12 is finally opened to exclude the field-winding portion $F^1$ from the circuit. In this way, the main-machine speed is increased, in accordance with familiar operating principles. It should be noted that the exclusion of the field-winding portion $F^1$ is effected in a gradual manner, whereby continuous-current conditions obtain, that is to say, the machine circuit is uninterrupted.

Figure 8:
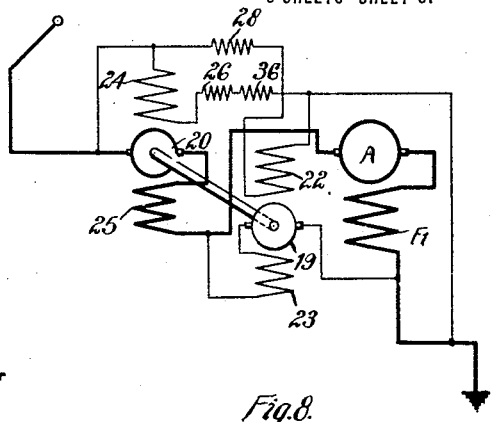

Assuming suitable coasting conditions of the main machine, regenerative operation thereof may be effected by throwing the reversing switch RS1 to its reversed position, in accordance with familiar principles, and actuating the master controller (not shown) to its initial regenerative position $a'$ to thereby close switches 1, 3, 9, 12 and 15, as indicated in the sequence chart of Fig. 2. One circuit is thereby completed from the Trolley switch 30 through conductors 42 and 55, switch 3, conductor 56, auxiliary resistor 28, the shunt-excited field winding 22, which is energized in the opposite direction from the energization thereof during the accelerating period, and switch 15 to the negative conductor 37. Thus, initially, relatively low negative voltage, that is, a voltage opposite to that delivered by the auxiliary generator armature 19 during acceleration, is now produced thereby and, as a result, a preliminary main exciting current flows from the positive terminal of the exciting armature 19 through conductors 52, 37 and 50 and thence through conductor 49, switch 12, the minor portion F1 of the main-field winding F, switch 9, conductors 48 and 47, the main armature A, conductors 46 and 51 and the series-related field winding 23 for the auxiliary generating armature 19 to the negative terminal thereof. Thus, a preliminary exciting current traverses the main field winding in such a direction as to cause the main machine to rapidly build up its voltage as a series generator in the proper direction. The circuit completed through the machine A is illustrated in Fig. 8 of the drawing.

By reason of the closure of the switch 1 and the open condition of the switches 4 and 5 at the beginning of the regenerative period, the shunt-excited field winding 24 for the auxiliary-motor armature 20 is relatively weakly excited, but a voltage temporarily somewhat higher than supply-circuit voltage obtains across the terminals of the auxiliary armature.

The design and proportion of parts of the various machines may be made such that the above-mentioned building-up of the voltage of the main momentum-driven machine may be rapidly effected to any desired value, preferably slightly above the supply-circuit voltage, and, throughout the regenerative period, the auxiliary armature 20 receives the difference in voltage between the main armature A and the supply-circuit voltage. Such regenerative operation can, therefore, be continued until substantially zero voltage and speed conditions of the main machine obtain, thereby tending to increase the efficiency and economy of operation.

To effect an increase of the main-machine excitation as the machine speed decreases during the braking period, the master controller may be actuated to its positions $b'$, $c'$, $d'$ and $e'$, whereby first the switch 8 is closed to complete a short-circuit of the major field-winding portion F2. The switch 7 is then closed to likewise short-circuit a section of the auxiliary resistor 27, while, at the same time, switch 11 is closed to connect the minor field-winding section F1 across another section of the resistor 27. The switch 9 is next opened to thus connect the major field-winding portion F2 and the corresponding section of the resistor 27 in parallel relation, and, finally, the switch 7 is opened to connect the section F2 in circuit to produce its full effect.

In position $f'$, the switch 10 is closed to short-circuit the minor field winding portion F1, while, in position $g'$, switch 12 is opened, thereby excluding the minor field winding portion F1 from circuit.

To further increase the main field-winding excitation, the switch 12 is reclosed in position $h'$, while switch 10 is opened in the subsequent position $i'$. In position $j'$, the switch 11 is also opened, whereby the minor field-winding portion F1 is connected in series relation with the major portion F2, that is, the full field winding F is utilized.

Thus, during the regenerative period, first a small portion, then a larger portion, and, finally, the complete main-field winding is utilized, to increase the main-machine excitation as the machine speed decreases, and such change of excitation is accomplished under continuous-current conditions, that is to say, the main circuit is uninterrupted at any time and the gradual transition of the field-winding parts is effected.

Furthermore, by the use of the system illustrated, the main-machine field excitation is made weaker during the initial portion of the regenerative period than at any time during acceleration, which is a very desirable feature in systems of the character under consideration.

To carry regenerative operation still further, switches 4 and 5 may be closed by actuating the master controller to its positions $k'$ and $l'$, respectively, whereby the shunt-excited field winding 24 for the auxiliary motor armature 20 is strengthened to correspondingly increase the voltage of the auxiliary armature, whereby the accordingly decreased main-armature voltage produces the same effect as an increased main-machine field excitation. Thus, regenerative operation may be continued until substantially zero voltage and speed conditions of the main machine are obtained.

The necessary capacity of the auxiliary motor-generator set may be relatively small, since the set is not employed after full supply-circuit voltage conditions are obtained during acceleration, as previously described in connection with the short-circuiting of the auxiliary driving motor.

Reference may now be had to Fig. 3, wherein the illustrated main dynamo-electric machine and the auxiliary motor-generator set are, in general, similar to those already described, with the exception that the main-field winding F is subdivided into three portions, F3, F4 and F5, while a variable resistor 63 is connected in circuit with the shunt-excited field winding 24 for the auxiliary-motor armature 20, and a variable resistor 64, together with a reversing switch RS2, is associated with the shunt-excited field winding 22 for the auxiliary-generator armature 19. A somewhat different arrangement of switches, particularly during the regenerative period, is also shown, as about to be described in detail.

Assuming that it is desired to effect acceleration of the main machine, the master controller (not shown), or its equivalent, may be actuated to its position $a$, whereby switches 4, 5, 6, 7, 8, 10 and 13 are closed, as indicated by the sequence chart, Fig. 4.

One circuit is thus completed from the Trolley switch 30 through conductors 65 and 66, the auxiliary field winding 24, conductor 67, switches 5, 6, 7, and 8, conductors 68, switch 10 and conductors 69 and 70 to the negative supply-circuit conductor "Ground". The auxiliary field winding 24 for the motor armature 20 is thus strongly excited for the purpose of producing a relatively high counter-electromotive force in the auxiliary armature, as previously set forth.

Another auxiliary circuit is completed from the Trolley switch 30 through conductor 71, certain contact members (not shown) of the reversing switch RS2, the entire resistor 64, conductor 72, the shunt-excited field winding 22 for the auxiliary generator armature 19, switch 4, conductor 73, certain other contact members (not shown) of the reversing switch RS2, and conductor 74 to the switch 10, whence circuit is completed as already traced.

Figure 9:
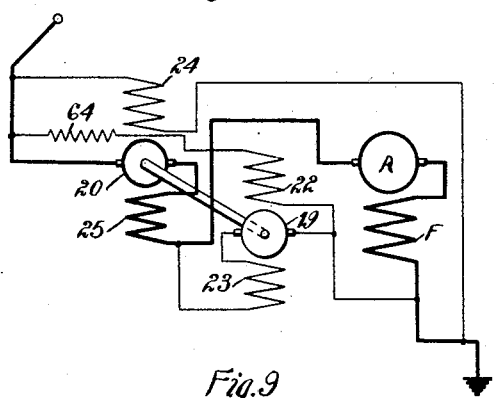

The main-machine circuit is established from the Trolley switch 30 through conductors 65 and 75, the auxiliary motor armature 20, conductor 76, series-related field winding 25, conductor 77, main armature A, conductor 78, reversing switch RS1, the entire main-field winding F, conductor 79, reversing switch RS1 and conductors 80 and 70 to the negative supply-circuit conductor "Ground". The circuits completed in position $a$ are illustrated in Fig. 9 of the drawing.

In the present instance, also, a circuit is completed from one terminal of the main armature A through conductor 81, the series-related field winding 23 for the auxiliary generator, the armature 19 thereof and conductor 82 which is connected to the negative supply-circuit conductor "Ground" to thus return energy to the supply circuit during the accelerating period.

As the master controller (not shown) is actuated through its successive positions $b$ to $g$, inclusive, the excitation of the field winding 24 for the auxiliary-motor armature is gradually reduced by opening the switches 5, 6 and 7 and the resultant gradual circuit-inclusion of the auxiliary resistor 63, while the energization of the auxiliary-field winding 22 for the generator armature 19 is gradually increased by the closure of the switches 1, 2 and 3. The strengthening and weakening effects just recited are preferably produced alternately, as indicated by the sequence chart, Fig. 4. In position $h$, the switch 8 is opened to entirely exclude the auxiliary-field winding 24 from circuit.

In position $i$, switch 15 is closed to short-circuit the series-related field winding 25 for the auxiliary-motor armature 20, while, in position $j$, switch 14 is closed to short-circuit the armature itself, as previously explained in connection with Fig. 1.

To further increase the main-motor speed, the master controller may be actuated to its final position $k$ to effect the closure of switch 12 and the opening of switch 13, whereby the field-winding portion F5 is excluded from circuit. It will be understood that, if desired, the previously-described method of transition from one set of main field-winding connections to another, including the resistor 27, may be utilized in connection with the present system.

Assuming that conditions are proper for regenerative operation, the master controller (not shown) may be actuated to its position $a'$ after the reversing switches RS1 and RS2 have been thrown to their reversed positions. By reason of the reversal of the excitation of the auxiliary-field winding 22, a negative voltage is produced by the auxiliary armature 19 to send a preliminary exciting current through the main-field-winding portion F3, which is the only initially active portion, since switches 12 and 13 are open, and through the main armature A in the proper direction to induce a rapid building-up of the main-machine voltage, in the manner previously explained. In the present case, however, the auxiliary-field windings 22 and 24 are not energized from the supply circuit or the main machine, as was the case in the system that is shown in Fig. 1, but are excited from the auxiliary armature 20, which has a relatively large preliminary voltage. One such circuit is completed from the Trolley switch 30 through conductor 71 and thence through the auxiliary resistor 64 and the field winding 22 in the opposite direction from that taken during the accelerating period to conductor 74, whence circuit is completed through conductor 68, switch 9, conductor 84, the auxiliary armature 20 and conductors 75 and 65 to the above-mentioned conductor 71. The circuit of the auxiliary-field winding 24 is completed from one terminal of the auxiliary armature 20 through conductors 75 and 66, the field winding 24, conductor 67 and switches 5, 6, 7, 8 and 9 to conductor 84 and the other terminal of the armature 20.

By reason of the circuit connections just described, the preliminary negative voltage of the auxiliary armature 19 may be made of a relatively large value, while the corresponding field-winding voltage automatically decreases as soon as the regenerative operation proper begins.

The automatic and inherent reduction of the exciting voltage for the auxiliary-generator armature 19 is primarily caused by the momentary traversal of a greater current through the series-related field winding 23 after the main-armature voltage has increased to the initial regenerative value, inasmuch as the series-related field winding 23 and the shunt-excited field winding 22 are now disposed in differential relation by reason of the reversal of the field winding 22.

Figure 10:
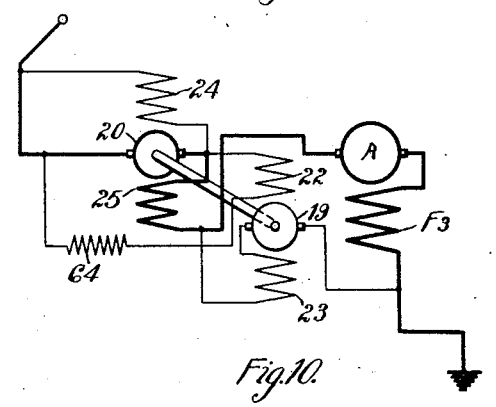

Furthermore, the excitation of the shunt-excited field winding 24 for the auxiliary-motor armature 20 from that armature rather than from the supply circuit allows the use of a smaller number of ampere-turns in the series-related field winding 25 in order to produce the desired effect, since the series field winding 25 is energized during regenerative operation oppositely to the excitation during the accelerating period and thus bears a differential relation to the shunt-excited field winding 24 under regenerative conditions, the shunt-field excitation gradually becoming weaker as the voltage of the armature 20 decreases. Thus, the initial cost and size and the operating losses of the field winding 25 may be correspondingly decreased. The circuits completed in position $a'$ are illustrated in Fig. 10 of the drawings.

In position $b'$ of the master controller (not shown), switch 12 is closed, whereupon switch 11 is opened, while, in position $c'$, switch 13 is closed and switch 12 is opened. Thus, the active turns of the main-field winding F are gradually increased by the successive addition of the portions F4 and F5, for a purpose already explained. It will be understood that, if desired, the gradual transition from one field-winding connection to another may be effected in connection with the resistor 27, as set forth in connection with Fig. 1.

In positions $d'$, $e'$ and $f'$, switches 5, 6 and 7 are respectively opened to thereby weaken the excitation produced by the shunt-excited, differentially-related field winding 24 for the auxiliary motor armature 20 for the purpose of increasing the auxiliary-armature voltage and thus further accomplishing suitable relations of voltages between the main armature and the auxiliary armature 20 to carry the regenerative operation to a substantially zero speed and voltage condition of the main machine.

Fig. 5 discloses a modified scheme for governing the relative excitations of the auxiliary generator and motor field windings 22 and 24, respectively. As is well-known by those skilled in the art, it is possible to carry accelerating operation a step farther than hereinbefore described by reversing the operation of the auxiliary driving machine to impress upon the main machine a voltage higher than the supply-circuit voltage. The circuit connections about to be described are adapted for the purpose just recited, and, in addition, are relatively simple in arrangement and economical in operation.

Figure 11:
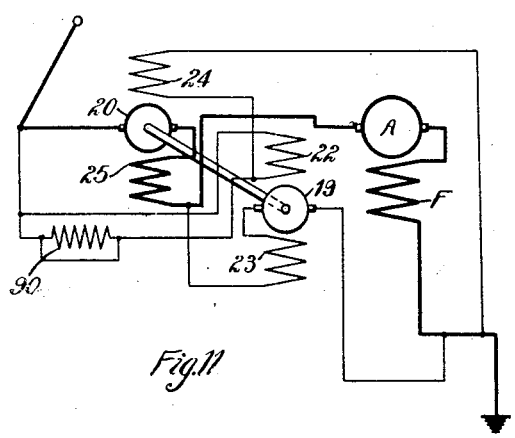

As indicated by the sequence chart of Fig. 6, the initial circuit connections include the closure of switches 2, 4, 5 and 8, whereby a circuit is established from the positive conductor 65, where the circuit divides, one branch including the auxiliary field winding 22, and the other branch including switch 2, and switches 4 and 5, which thereby completely short-circuit a resistor 90, whence circuit is completed from the low-voltage terminal of the field winding 22 through the field winding 24 and switch 8 to the negative conductor 74. Thus, the auxiliary motor-field winding 24 is initially energized strongly while the auxiliary-generator field winding 22 is at first short-circuited or weakly excited without the use of a circuit resistor, for purposes already set forth in connection with Fig. 1. Switches 5 and 4 are next successively opened, as indicated in Fig. 6, to correspondingly weaken the excitation of the motor-field winding 24, and simultaneously more strongly excite the generator field winding 22. The circuits completed in position $a$ are illustrated in Fig. 11 of the drawing.

In position $d$, the opening of switch 2 is effected to directly connect the series-related field windings across the supply circuit and open-circuit the resistor 90, while, in position $e$, switch 1 is closed to shunt resistor 90 around the motor-field winding 24. In positions $f$ and $g$, switches 4 and 5 are respectively closed to gradually short-circuit the resistor 90 and weaken the excitation of the field winding 24.

In position $h$, the switch 8 is opened and in position $i$, the switch 3 is closed to thereby complete a new circuit from the positive conductor 65 through conductor 91, resistor 92, switch 3, auxiliary motor-field winding 24, in the reversed direction, switches 4 and 5, and switch 1 to the negative conductor 74.

In positions $j$ and $k$, switches 6 and 7 are respectively closed to gradually short-circuit the resistor 92.

In this manner and by a suitable design and proportion of parts, the excitation of the motor-field winding 24 may be gradually reduced, reversed and increased, in that order, while the energization of the generator-field winding 22 may be gradually increased, with a minimum use of resistors. The auxiliary field-winding connections just described may, of course, be utilized in other systems, but are especially advantageous in systems of the type previously described.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. In a system of regenerative control, the combination with a momentum-driven dynamo-electric machine having a predetermined number of exciting field-winding turns, of means for successively increasing the number of active field-winding turns as the machine speed decreases.

2. In a system of regenerative control, the combination with a momentum-driven dynamo-electric machine having a plural-part exciting field winding, of means for successively employing said parts in such manner as to effect a number of excitation conditions greater than the number of said parts.

3. In a system of regenerative control, the combination with a momentum-driven dynamo-electric machine provided with a field winding having a plurality of unequal parts, of means for utilizing the parts in the increasing order of their size, and means for combining said parts, whereby a gradually increasing machine excitation obtains as the machine speed decreases.

4. In a system of regenerative control, the combination with a momentum-driven dynamo-electric machine provided with a field winding having a plurality of unequal parts, of means for successively utilizing the parts in the increasing order of their size and for combining said parts while maintaining continuous-current conditions, whereby a gradually increasing machine excitation obtains as the machine speed decreases.

5. In a system of regenerative control, the combination with a momentum-driven main dynamo-electric machine, of an auxiliary armature for initially energizing the main machine in the proper "building-up" direction, a second auxiliary armature mechanically connected to the first auxiliary armature and electrically connected to the main armature, and a field winding for the first auxiliary armature energized from the second auxiliary armature.

6. In a system of regenerative control, the combination with a momentum-driven main dynamo-electric machine, of an auxiliary armature for initially energizing the main machine in the proper "building-up" direction, a series-related field winding for said auxiliary armature, a second auxiliary armature mechanically connected to the first auxiliary armature and electrically connected in series relation with the main armature, and a field winding for the first auxiliary armature differentially energized from the second auxiliary armature.

7. In a system of regenerative control, the combination with a momentum-driven main dynamo-electric machine, of an auxiliary armature for initially energizing the main machine in the proper "building-up" direction, a series-related field winding for said auxiliary armature, a second auxiliary armature mechanically connected to the first auxiliary armature and electrically connected in series relation with the main armature, a series related field winding for the second auxiliary armature, and other field windings for the auxiliary armatures energized from said second auxiliary armature.

8. In a system of regenerative control, the combination with a supply circuit and a momentum-driven main dynamo-electric machine, of an auxiliary dynamo-electric machine for initially energizing the main-machine field winding in the proper "building-up" direction and having a field winding energized from a source other than said supply circuit, and means for reducing the exciting voltage for said auxiliary armature when the main-machine voltage has built up.

9. In a system of control, the combination with a supply circuit and a plurality of field windings energized therefrom, of means for simultaneously increasing the strength of one field winding and decreasing the strength of a second field winding, means for disconnecting one end of said second winding from one supply-circuit conductor, means for connecting said disconnected end to the other supply-circuit conductor, and means for varying the strength of the second field winding alone.

10. In a system of control, the combination with a supply circuit and a plurality of field windings connected in series relation across the supply circuit, of an initially short-circuited resistor bridging one of said field windings, means for increasing the effective value of, and then open-circuiting, said resistor, means for connecting said resistor across a second field winding and gradually short-circuiting the resistor, means for disconnecting one end of said second field winding from one supply-circuit conductor, a second resistor, means for connecting said disconnected end through said second resistor to the other supply-circuit conductor, and means for varying said second resistor.

11. The method of varying the excitation of a plurality of field windings connected in series relation across a supply circuit, one of the windings being initially bridged by a short-circuited resistor, that consists in increasing the effective value of, and then open-circuiting said resistor, connecting the resistor across a second field winding, gradually short-circuiting the resistor, disconnecting one end of said second field winding from one supply-circuit conductor, connecting said disconnected end through a resistance circuit to the other supply-circuit conductor, and varying the value of said resistance circuit.

12. In a system of regenerative control, the combination with a series-excited dynamo-electric machine having a predetermined number of exciting field-winding turns, of means for increasing the effective series excitation per unit of regenerative load current as the machine speed decreases.

13. In a system of regenerative control, the combination with a momentum-driven main dynamo-electric machine having a series-excited field winding, of an auxiliary dynamo-electric machine armature for initially energizing said field winding in the proper "building-up" direction, and means for reducing the exciting voltage for said auxiliary armature when the main-machine voltage has been built up.

In testimony whereof I have hereunto subscribed my name this 31st day of January, 1917.

RUDOLF E. HELLMUND.